Figure 1:
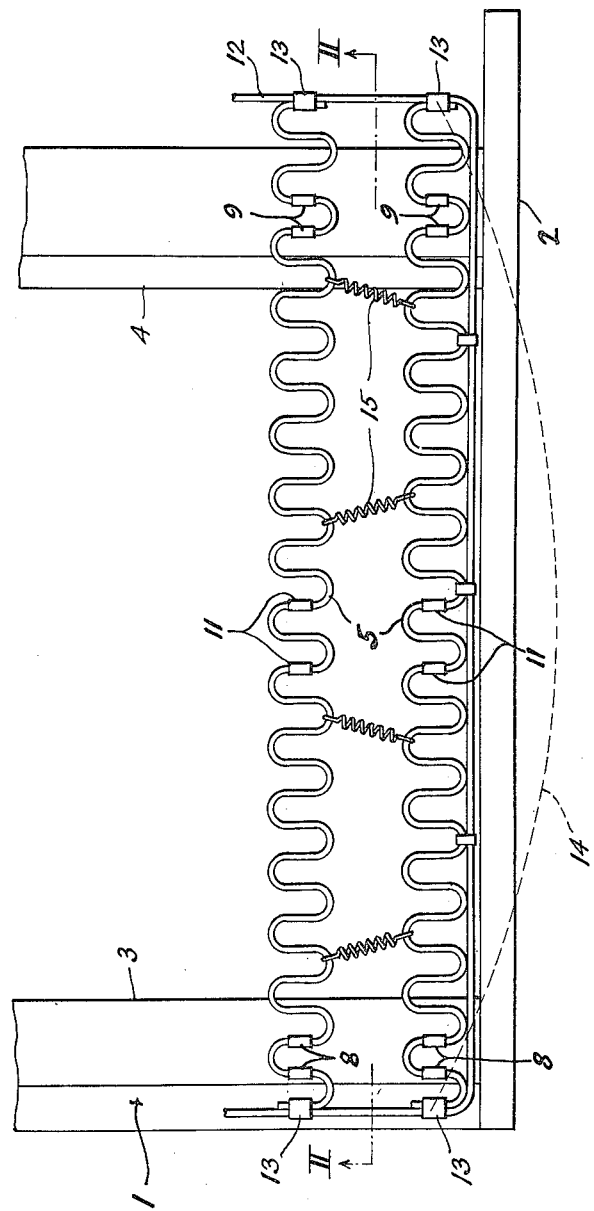

Oct. 16, 1951  R. C. BATEMAN ET AL  2,571,184
ZIG-ZAG SPRING SEAT

Filed Oct. 26, 1946  2 Sheets-Sheet 1

INVENTOR.
Ralph C. Bateman
Benjamin J. Schnitzer
BY A H Oldham
ATTORNEY

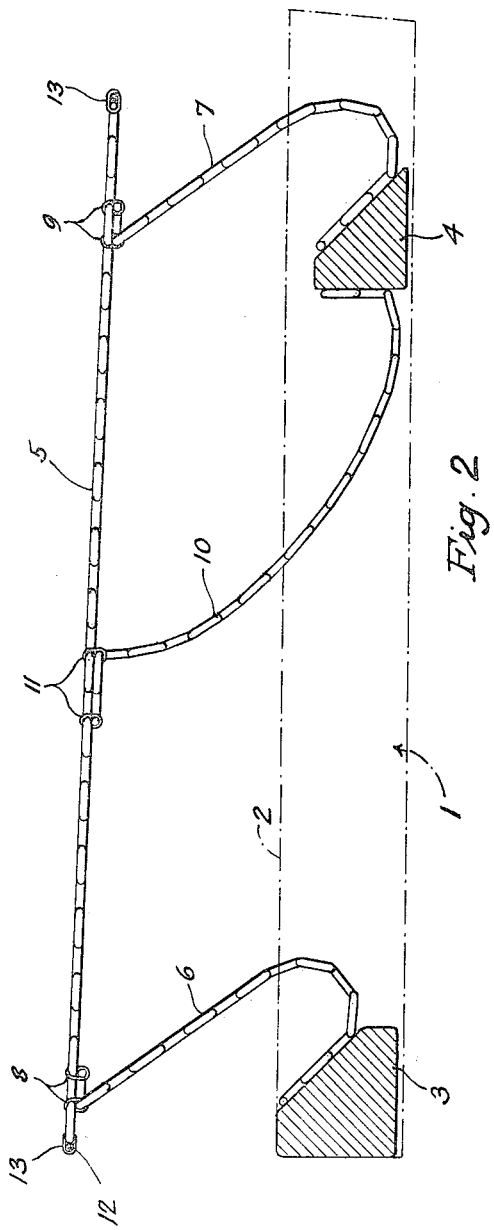

Patented Oct. 16, 1951

2,571,184

UNITED STATES PATENT OFFICE 2,571,184

ZIGZAG SPRING SEAT

Ralph C. Bateman and Benjamin J. Schnitzer, Akron, Ohio, assignors to Goodyear Aircraft Corporation, Akron, Ohio, a corporation of Delaware Application October 26, 1946, Serial No. 706,000

3 Claims. (Cl. 155—179)

1

This invention relates to seats and springing therefor, and, more particularly, to zig-zag wire springs and constructions thereof for upholstered furniture, automobile, and other seats.

Seats have been constructed heretofore employing zig-zag wire springs for resiliently carrying a load supporting portion. However, zig-zag wire springs have been classified by furniture dealers as "cheap" and not providing the cushioning action or long wear of other types of springs. This reaction built up in the mind of furniture or automobile dealers has resulted from the fact that zig-zag wire springing has often been carelessly designed and constructed and problems of fatigue, lack of adequate cushioning, permanent set, and the like, have been encountered.

It is the general object of the invention to avoid and overcome the foregoing and other difficulties of and objections to the use of zig-zag wire springs by the provision of an improved, engineered, and tested seat construction employing zag-zag wire springs having a comfort, fatigue resistance, resiliency, and long life, not only as good as other known forms of springing, but in almost every respect being superior to other conventional springing means.

Another object of the invention is to provide a relatively inexpensive light weight, easily assembled, deeply resilient, spring support for use in automobile seats, upholstered furniture, or in other seating or similar constructions.

The foregoing objects of the invention, and other objects which will become apparent as the description proceeds, are achieved by the provision of a seat including a frame, a plurality of members positioned side by side in the frame, each member comprising a substantially straight load-carrying portion of zig-zag spring wire, front and back support legs for said portion and formed of zig-zag spring wire, the legs having substantially a J-shape, and with the upper end of the J being secured to the load carrying portion at points spaced from the ends thereof to provide cantilever overhangs at each end of the load carrying portions. The lower end of the J is secured to the frame, and each J is tilted so as to be positioned out of the vertical. Usually a center support made of zig-zag spring wire and extending substantially from the center of the load carrying portion on a curve to connect to the frame adjacent one of the legs is used to achieve the best possible resilient action. The load carrying portions at the sides of the seat may be formed in the plane of the spring on

2 an outwardly extending curve, with link means flexibly connecting the load carrying portions of the several members to straighten out the outwardly extending curves to thereby apply lateral tension to the load carrying portions of the seat.

For a better understanding of the invention, reference should be had to the accompanying drawings, wherein:

Fig. 1 is a plan view of one embodiment of a seat incorporating the principles of the invention, a considerable portion of the seat being broken away; and Fig. 2 is a vertical sectional view taken substantially on line II—II of Fig. 1, and for the purpose of clearness, this figure of the drawing diagrammatically illustrates the spring construction.

In the drawings, the numeral 1 indicates a frame which may take any of a variety of shapes, and be made from any desired material. Conveniently, and preferably, the frame is made from light weight sheet metal such as aluminum or its alloys, and the frame has end members 2 and front and rear cross beams 3 and 4. It will be understood that the seat illustrated and described is ordinarily employed as the resting portion of a seat, that is the seat bottom, but it should be recognized that the principles of the invention may also be utilized in conjunction with a seat back.

As best seen in Fig. 1, the seat includes a plurality of members positioned side by side in the frame, and extending from the front to the back thereof, each member comprising a load carrying portion 5 of zig-zag spring wire, this load carrying portion being substantially straight from front to rear, in the manner illustrated in Fig. 2. Associated with each load carrying portion 5 are front and back support legs 6 and 7, ordinarily made of zig-zag spring wire, and having a J-shape in vertical section. The upper ends of the support legs 6 and 7 are bent at an angle, and are secured by clips 8 and 9 to the load carrying portion 5. The lower ends of the support legs 6 and 7 are secured, respectively, to the cross beams 3 and 4. It will be noted that the support legs 6 and 7 are substantially or identically the same size and shape, and that they are ordinarily tilted or inclined so that they are positioned in the manner as shown in Fig. 2. Both of the support legs have been shown with the open side of the J facing forwardly, but it is possible to construct the improved seat by making both of the J's face rearwardly, or with the J-shape support legs facing toward or away from each other.

An important feature of the invention is to employ an extra center support for the middle of the load carrying portion 5, and this is achieved in the manner shown in Fig. 2 by a center support 10 which is secured by clips 11 to substantially the center of the load carrying portion 5, and which extends on a gradual curve to a position adjacent one of the cross-beams, preferably the cross-beam 4, to which it is secured.

Any desired number of the load carrying portions 5 may be mounted side by side in the frame 1, for example, to make a full width davenport, an automobile seat, a lounge chair, or the like. For example, in one embodiment of a davenport incorporating the features of the invention nineteen load carrying portions were employed, and in a single lounge chair of typical manufacture, seven load carrying portions were used.

An edge wire 12, secured in place by clips 13, is preferably used around the edge of the load carrying portions 5. Also, the edge load carrying portions 5 are preferably formed with a convex or outer curve, as indicated by the line 14, and in the plane of the load carrying portion. This is so that when wire springs or wire links 15 are utilized to laterally connect the load carrying portions 5 together, the edge load carrying portions are pulled back to the solid line position shown in Fig. 1, but when so held a lateral tension is applied on all of the load carrying portions 5 to give a desirable lateral stability to the seat.

It will be recognized that the spring structure thus provided can be finished in any known or conventional way, with the use of sisal or cotton padding, rubberized hair, cellular rubber, or other means to achieve an upholstered seat construction having a substantially conventional outside appearance. Also, feet of one construction or another will support the frame 1 several inches off of the floor so that the center support 10 and the spring legs 6 and 7 can have satisfactory springing movement.

From the foregoing, it will be recognized that the various objects of the invention have been achieved by the provision of a simple, relatively inexpensive, practical seat structure employing zig-zag springs and having a high degree of comfort, a minimum of weight, and an exceptionally good fatigue and break down resistance.

While in accord with the patent statutes one embodiment of the invention has been illustrated and described in detail, it is to be particularly understood that the invention is not limited thereto or thereby, but that the scope of the invention is defined in the appended claims.

What is claimed is:

1. A seat including a rigid frame, a plurality of members positioned side by side above the frame, each member comprising a substantially straight load-carrying portion formed of zig-zag spring wire, front and back support legs for said portion and formed of zig-zag spring wire, said legs being substantially of the same size and having substantially a J-shape with curved bottom and with the upper end of the J being secured to the load-carrying portion at points spaced from the ends thereof to provide cantilever overhangs at each end of the load-carrying portion and with the lower end of the J being secured to the frame, each J being tilted so as to be positioned out of the vertical and in the same direction, and a center support made of zig-zag spring wire and extending substantially from the center of the load-carrying portion on a curve to connect to the frame adjacent one of the legs.

2. A seat including a rigid frame, a plurality of members positioned side by side above the frame, each member comprising a substantially straight load-carrying portion formed of zig-zag spring wire, and front and back support legs for said portion and formed of zig-zag spring wire, said legs being substantially of the same size and having substantially a J-shape with curved bottom and with the upper end of the J being secured to the load-carrying portion at points spaced from the ends thereof to provide cantilever overhangs at each end of the load-carrying portion and with the lower end of the J being secured to the frame, each J being tilted so as to be positioned out of the vertical and in the same direction.

3. A seat including a rigid frame, a plurality of members positioned side by side above the frame, each member comprising a substantially straight load-carrying portion formed of zig-zag spring wire, front and back supports in tilted position for said portion and formed of zig-zag spring wire, each of said supports having a short and a long leg substantially parallel to each other and connected by a curved bottom portion, and a center support made of zig-zag spring wire and extending substantially from the center of the load-carrying portion on a curve to connect to the frame adjacent one of the short legs.

RALPH C. BATEMAN.
BENJAMIN J. SCHNITZER.

REFERENCES CITED

The following references are of record in the file of this patent:

UNITED STATES PATENTS

| Number | Name | Date |
| --- | --- | --- |
| 2,185,036 | Menge | Dec. 26, 1939 |
| 2,308,772 | Neely | Jan. 19, 1943 |
| 2,341,015 | Bulmensaadt | Feb. 8, 1944 |
| 2,364,499 | Wolofski | Dec. 5, 1944 |
| 2,386,456 | Haberstump | Oct. 9, 1945 |

FOREIGN PATENTS

| Number | Country | Date |
| --- | --- | --- |
| 206,149 | Switzerland | Oct. 16, 1939 |